US012618436B2

(12) United States Patent
Chiu et al.

(10) Patent No.: US 12,618,436 B2
(45) Date of Patent: May 5, 2026

(54) SLIDE RAIL ASSEMBLY

(71) Applicant: Nan Juen International Co., Ltd.,
Taoyuan City (TW)

(72) Inventors: I-hsiang Chiu, Taoyuan City (TW);
Kuo-Chih Huang, Taoyuan City (TW);
Hung-Chieh Hou, Taoyuan City (TW)

(73) Assignee: Nan Juen International Co., Ltd.,
Taoyuan City (TW)

( * ) Notice: Subject to any disclaimer, the term of this
patent is extended or adjusted under 35
U.S.C. 154(b) by 12 days.

(21) Appl. No.: 18/883,985

(22) Filed: Sep. 12, 2024

(65) Prior Publication Data

US 2026/0009425 A1     Jan. 8, 2026

(30) Foreign Application Priority Data

Jul. 3, 2024     (TW) .................................. 113125108

(51) Int. Cl.
F16C 29/02          (2006.01)
(52) U.S. Cl.
CPC .................................... F16C 29/02 (2013.01)
(58) Field of Classification Search
CPC ..... F16C 29/02; A47B 88/463; A47B 88/467;
A47B 88/477; A47B 88/483; A47B
88/49; A47B 2210/0018; A47B
2210/0091
See application file for complete search history.

(56) References Cited

U.S. PATENT DOCUMENTS

| | | | | |
|---|---|---|---|---|
| 7,980,640 B2 * | 7/2011 | Yang | .................... | A47B 88/467 |
| | | | | 312/319.1 |
| 8,118,378 B2 * | 2/2012 | Wei | .................... | A47B 88/477 |
| | | | | 312/319.1 |
| 8,590,989 B2 * | 11/2013 | Lowe | .................... | A47B 88/467 |
| | | | | 312/319.1 |
| 8,888,200 B2 * | 11/2014 | Sato | ........................ | E05F 5/003 |
| | | | | 312/319.1 |
| 8,939,525 B1 * | 1/2015 | Chen | .................... | A47B 88/467 |
| | | | | 312/333 |
| 10,499,737 B2 * | 12/2019 | Kim | ...................... | A47B 88/483 |
| 10,781,855 B2 * | 9/2020 | Chen | .................... | F16C 29/063 |
| 11,395,546 B2 * | 7/2022 | Lee | .................... | A47B 88/483 |
| 2004/0174101 A1 * | 9/2004 | Lin | ........................ | F16F 9/0218 |
| | | | | 312/333 |
| 2009/0140621 A1 * | 6/2009 | Yang | .................... | A47B 88/467 |
| | | | | 312/319.1 |
| 2018/0306236 A1 * | 10/2018 | Liu | ........................ | F16C 29/005 |

FOREIGN PATENT DOCUMENTS

| | | | | | |
|---|---|---|---|---|---|
| CN | 112932117 A | * | 6/2021 | ........... | A47B 88/467 |
| WO | WO-2012094812 A1 | * | 7/2012 | ........... | A47B 88/467 |

* cited by examiner

*Primary Examiner* — Eret C Mcnichols

(57) ABSTRACT

A slide rail assembly includes a first frame, a first bracket
displaced relative to the first frame and having a first hollow
portion, a positioning plate set on the first frame and located
in the first hollow portion and having a positioning hole, and
a displacement module connected to the first frame and the
first bracket respectively. Thereby, the displacement module
allows the first bracket to move in a first direction, extend
and reset to drive the first bracket to move in a second
direction opposite to the first direction.

9 Claims, 12 Drawing Sheets

13

SLIDE RAIL ASSEMBLY

BACKGROUND OF THE INVENTION

1. Field of the Invention

The present invention relates to a slide rail assembly, wherein a first bracket and a displacement module are displaced and assembled on a first frame.

2. Description of the Related Art

Generally speaking, the slide rail assembly can be mounted to a column of a rack via a first frame, and a spring is respectively assembled to the first frame and the first bracket, and the first bracket is displaced relative to the first frame, and the spring provides elasticity to the first bracket to make the first bracket displace toward the column. However, as market demands change, how to develop a different type of slide product has become an issue that cannot be ignored.

SUMMARY OF THE INVENTION

According to the viewpoint of the present invention, a slide rail assembly comprises a first frame; a first bracket being displaced relative to said first frame and comprising a first hollow portion; a positioning plate set on the first frame and located in the first hollow portion and comprising a positioning hole; and a displacement module comprising a first shell combined with the first frame, a second shell combined with the first bracket and a telescopic member having two opposite ends thereof respectively connected to the first shell and the second shell. Thereby, when the telescopic member drives the second shell to be displaced, extended and reset in the first shell, allowing the first bracket to be displaced and extended in a first direction, the positioning plate abuts against one end of the first hollow portion to form a limit to prevent the first bracket from continuing to move in the first direction and drive the first bracket to reset in a second direction opposite to said first direction, and the positioning plate abuts an opposite end of the first hollow portion to form a limit to prevent the first bracket from continuing to move in the second direction.

Preferably, the first frame and the positioning plate are integrally formed.

Preferably, the first frame and the positioning plate are separately made.

Preferably, the first shell comprises a first fixing groove, a second fixing groove, a first accommodating space, a plurality of first limiting portions and a plurality of second limiting portions, the first fixing groove being combined with the first frame, the second limiting portions being respectively abutted against rails of the first frame; the second shell comprises a third fixing groove, a fourth fixing groove and a second accommodating space, the second shell having one end surface thereof abutting the first limiting portions for displacement of the second shell within the first accommodating space, the third fixing groove being combined with the first bracket; the telescopic member has two opposite ends thereof respectively connected to the second fixing groove and the fourth fixing groove, and is accommodated in the first accommodating space and the second accommodating space to extend and reset.

Preferably, the first shell further comprises a third limiting portion, the third limiting portion comprising an abutting side surface; the second shell further comprises at least one fourth limiting portion, the at least one fourth limiting portion corresponding to the abutting side surface of the third limiting portion for limiting the second shell in the first accommodating space.

Preferably, the first bracket further comprises a bracket protrusion combined with the third fixing groove, the bracket protrusion being set within the second hollow portion for displacement; the first frame further comprises a first protrusion and a second hollow portion, the first protrusion being combined with the first fixing groove.

Preferably, the telescopic member is selected from the group of springs, hydraulic rods, pneumatic rods, and other components that are able to be reset after being stretched under force.

Preferably, the slide rail assembly further comprises a second bracket and a rail member respectively installed on the first frame, the second bracket being located at an opposite end of the first bracket relative to the first frame, the rail member comprising an extension section that protrudes after being folded, the extension section being adjacent to the positioning plate to allow one extended end surface of the extension section to be aligned with the positioning hole of the positioning plate.

Preferably, the positioning plate further comprises two fixing holes, and the positioning hole is located between the two fixing holes.

DETAILED DESCRIPTION OF THE PREFERRED EMBODIMENT

Figure 1A:
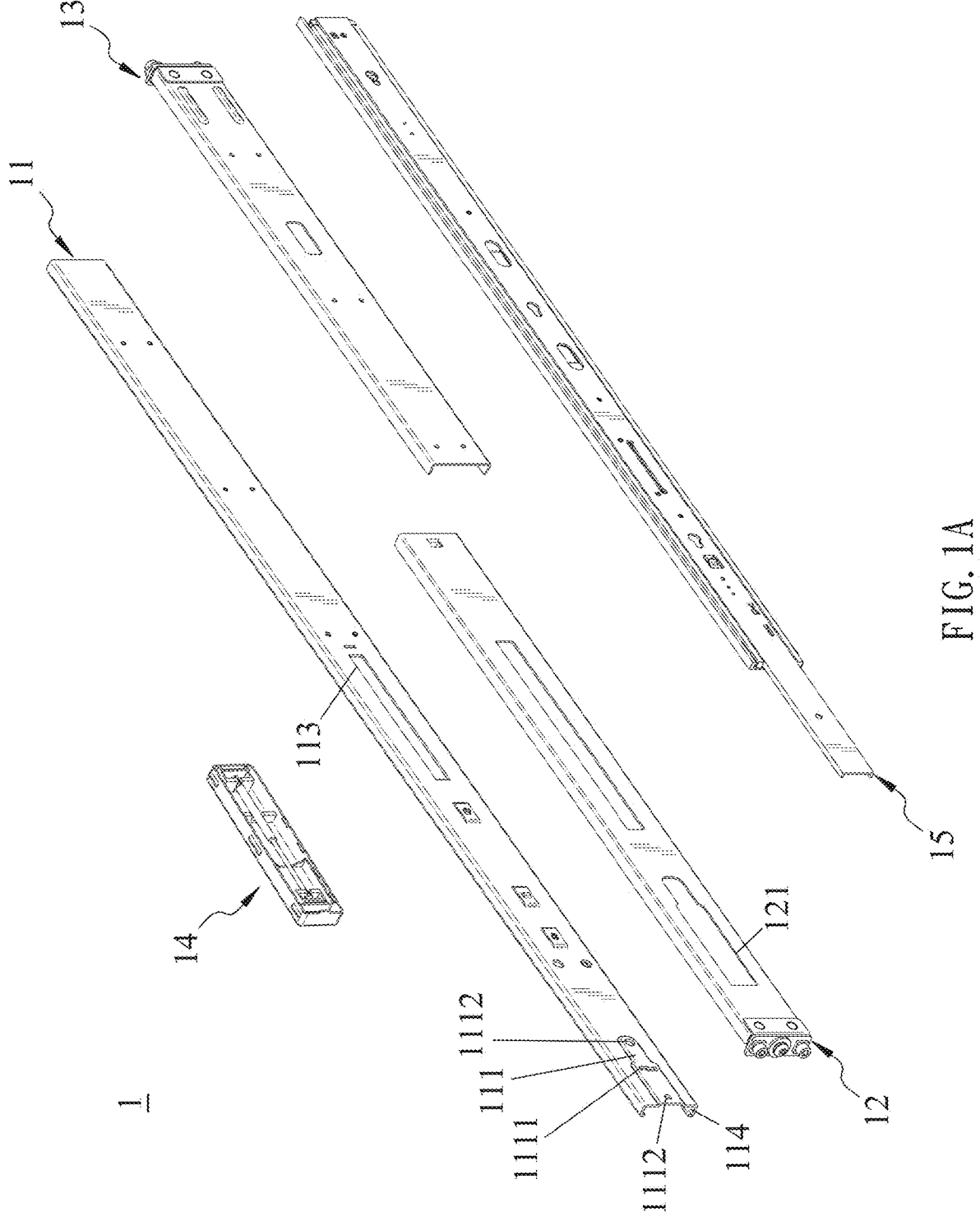
FIG. 1A and FIG. 1B are exploded schematic diagrams of the slide rail assembly of the present invention.

Referring to FIG. 1A, FIG. 1B to FIG. 4, the present invention provides a slide rail assembly 1, comprising a first frame 11, a first bracket 12, a second bracket 13, a displacement module 14, and a rail member 15. The second bracket 13 and the rail member 15 are respectively installed on the first frame 11. The second bracket 13 is located at the other end of the first bracket 12 relative to the first frame 11. The displacement module 14 is respectively assembled with the first frame 11 and the first bracket 12. The first bracket 12 and the second bracket 13 can be assembled on a column of the industrial server through a first fastener and a second fastener respectively (not shown in the figures).

A positioning plate 111 is disposed on the first frame 11. The first bracket 12 has a first hollow portion 121. The positioning plate 111 is located in the first hollow portion 121. The positioning plate 111 has two fixing holes 1112, and a positioning hole 1111 located between the two fixing holes 1112.

The positioning plate 111 may be integrally formed on the first frame 11 (e.g., by stamping), or may be separately formed and then assembled on the first frame 11. The present invention is described by taking the positioning plate 111 as an integral part of the first frame 11 as an example, and the example is not intended to limit the patent scope of the present invention.

Figure 5:
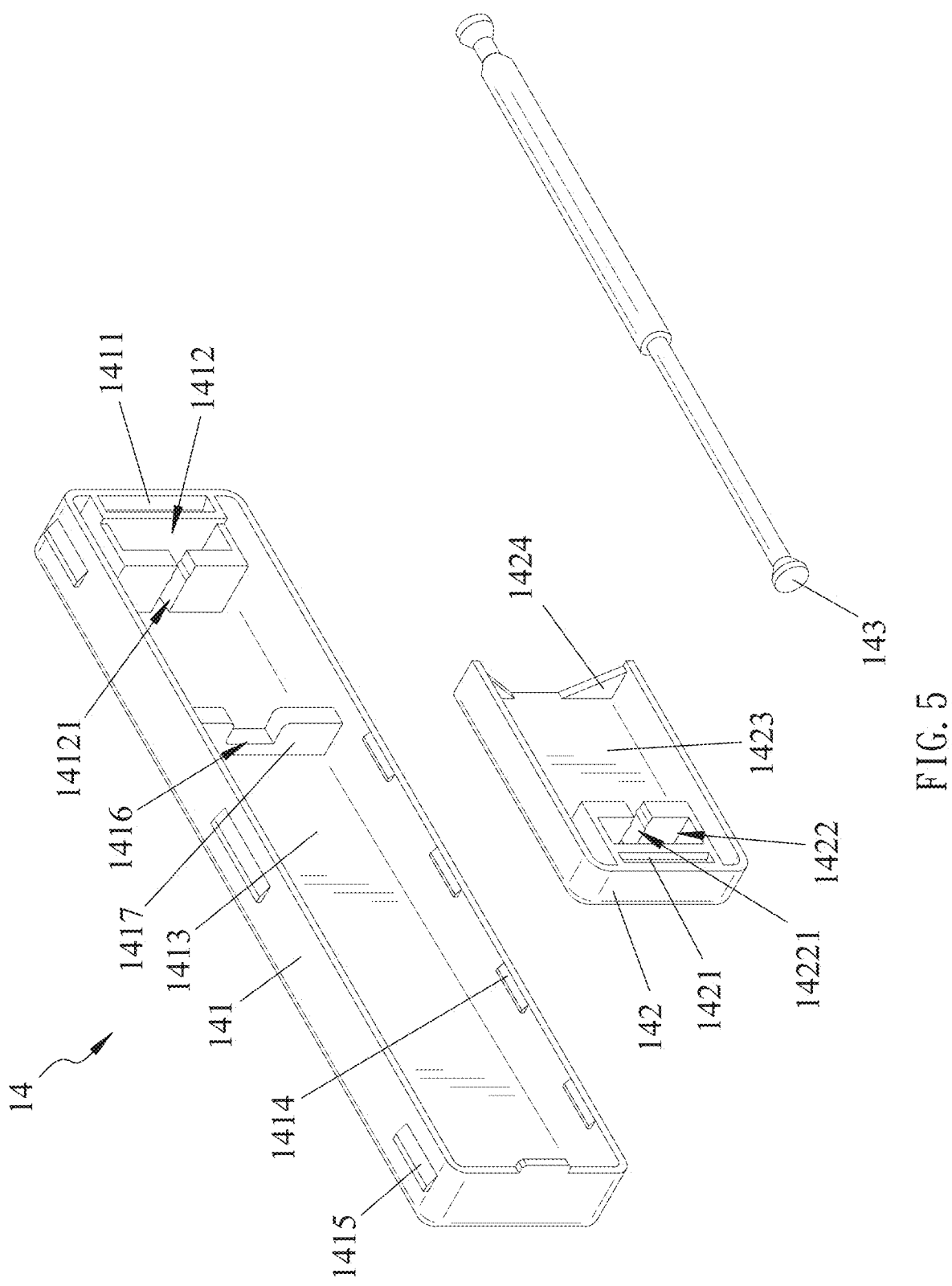
FIG. 5 is an exploded schematic diagram of the displacement module of the slide rail assembly of the present invention.

Please refer to FIG. 5 again, in which the displacement module 14 comprises a first shell 141, a second shell 142 and a telescopic member 143. The first shell 141 has a first fixing groove 1411, a second fixing groove 1412, a first accommodating space 1413, a plurality of first limiting portions 1414, a plurality of second limiting portions 1415 and a third limiting portion 1416. The third limiting portion 1416 has an abutting side surface 1417. The second fixing groove 1412 has a first fixing portion 14121 and a first bearing portion 14122. The second shell 142 has a third fixing groove 1421, a fourth fixing groove 1422, a second accommodating space 1423 and at least one fourth limiting portion 1424. The fourth fixing groove 1422 has a second fixing portion 14221 and a second bearing portion 14222. The plurality of second limiting portions 1415 abut against the rails 114 extending from two opposite sides of the first frame 11. The second shell 142 is located in the first accommodating space 1413 with an end surface thereof abutting against the plurality of first limiting portions 1414. The at least one fourth limiting portion 1424 corresponds to the abutting side surface 1417 of the third limiting portion 1416. The two ends of the telescopic member 143 are respectively connected to the second fixing groove 1412 and the fourth fixing groove 1422 to form a limit. One end of the telescopic member 143 is limited by the first fixing portion 14121 and the first bearing portion 14122, and the other end of the telescopic member 143 is limited by the second fixing portion 14221 and the second bearing portion 14222. The telescopic member 143 is accommodated in the first accommodating space 1413 and the second accommodating space 1423, the first fixing groove 1411 and the first frame 11 are assembled, and the third fixing groove 1421 and the first bracket 12 are assembled.

The first fixing portion 14121 and the second fixing portion 14221 may be in the form of a side groove and a convex portion with two side walls extending opposite to each other, or may be a teardrop-shaped side groove. The present invention is described using the convex portion as an example, and the example is not intended to limit the patent scope of the present invention.

The telescopic member 143 is a spring, a hydraulic rod, a pneumatic rod or other member capable of restoring after being stretched under force. The present invention is described using a hydraulic rod as an example, and the example is not intended to limit the patent scope of the present invention.

The displacement module 14 has a modular structure for replacing different telescopic members, and the repair and disassembly effects are better. The plurality of first limiting portions 1414 and the plurality of second limiting portions

1415 are preferably made of non-metallic material, such as plastic material, or one of the plurality of first limiting portions 1414 and the plurality of second limiting portions 1415 comprises plastic material, and the other of the plurality of first limiting portions 1414 and the plurality of second limiting portions 1415 comprises metal material, so as to better adapt to different usage environments. The present invention is described using plastic materials as an example, and the example is not intended to limit the patent scope of the present invention.

Figure 1B:
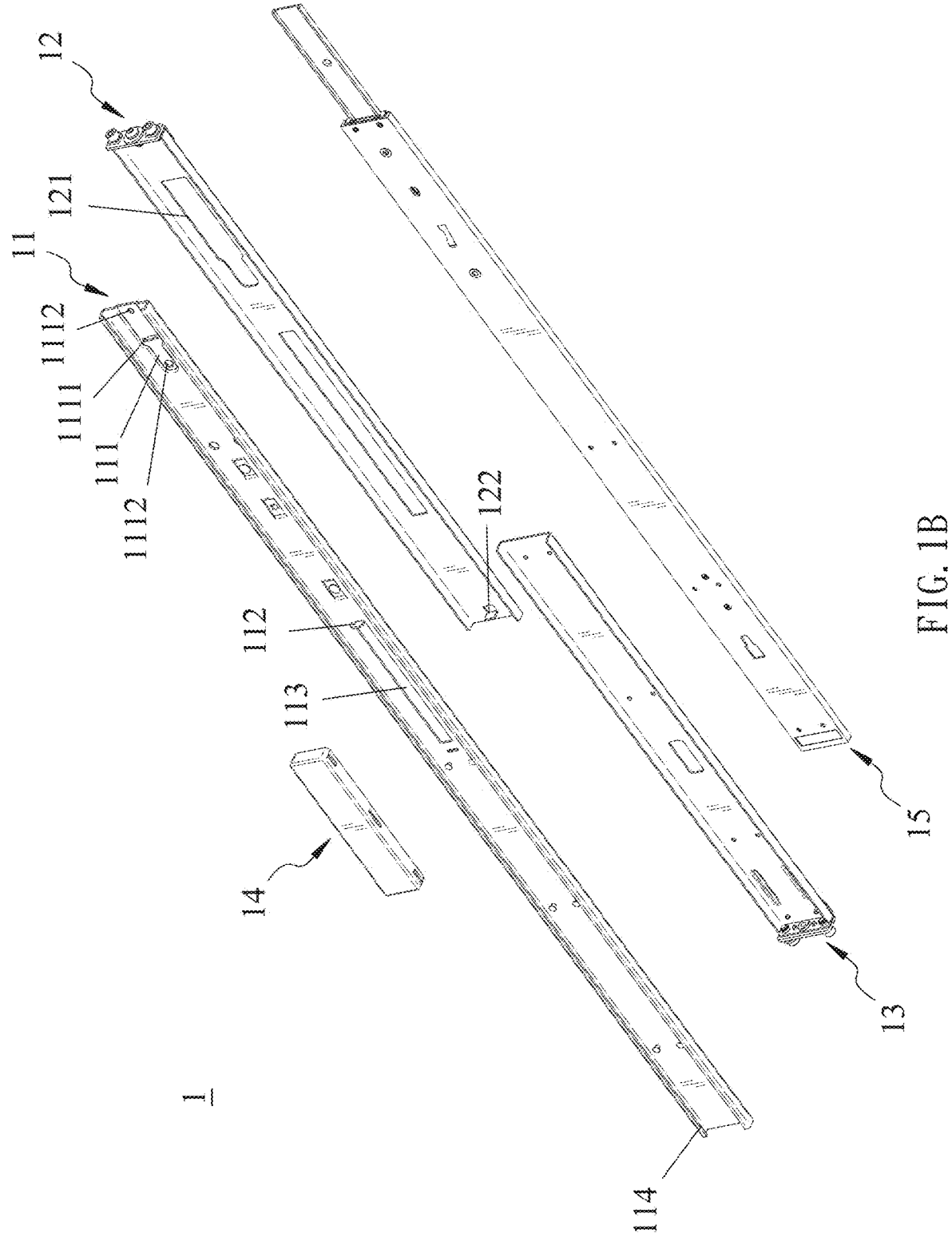
Figure 2:
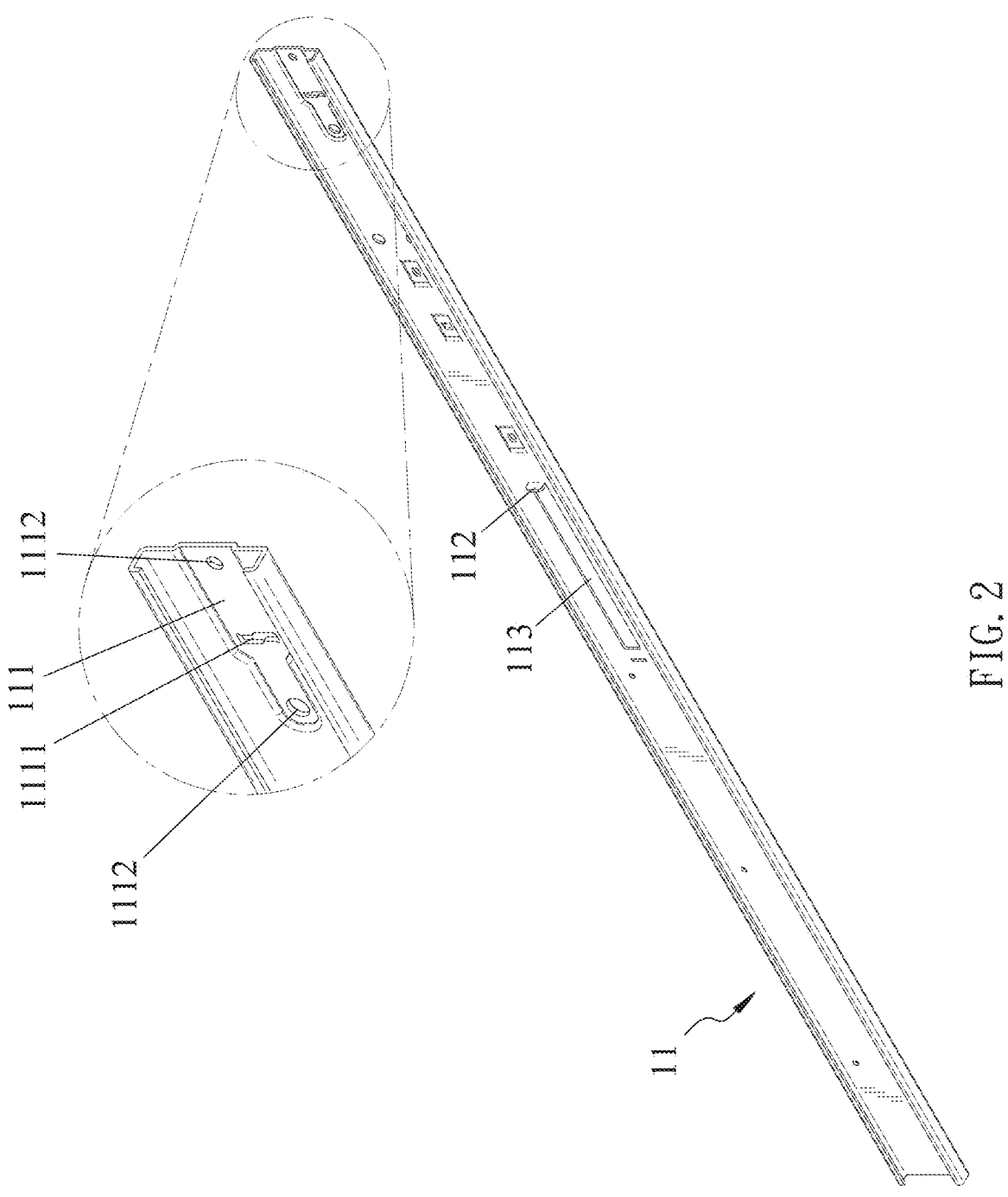
FIG. 2 is a three-dimensional schematic diagram of the first frame of the slide rail assembly of the present invention.
Figure 3:
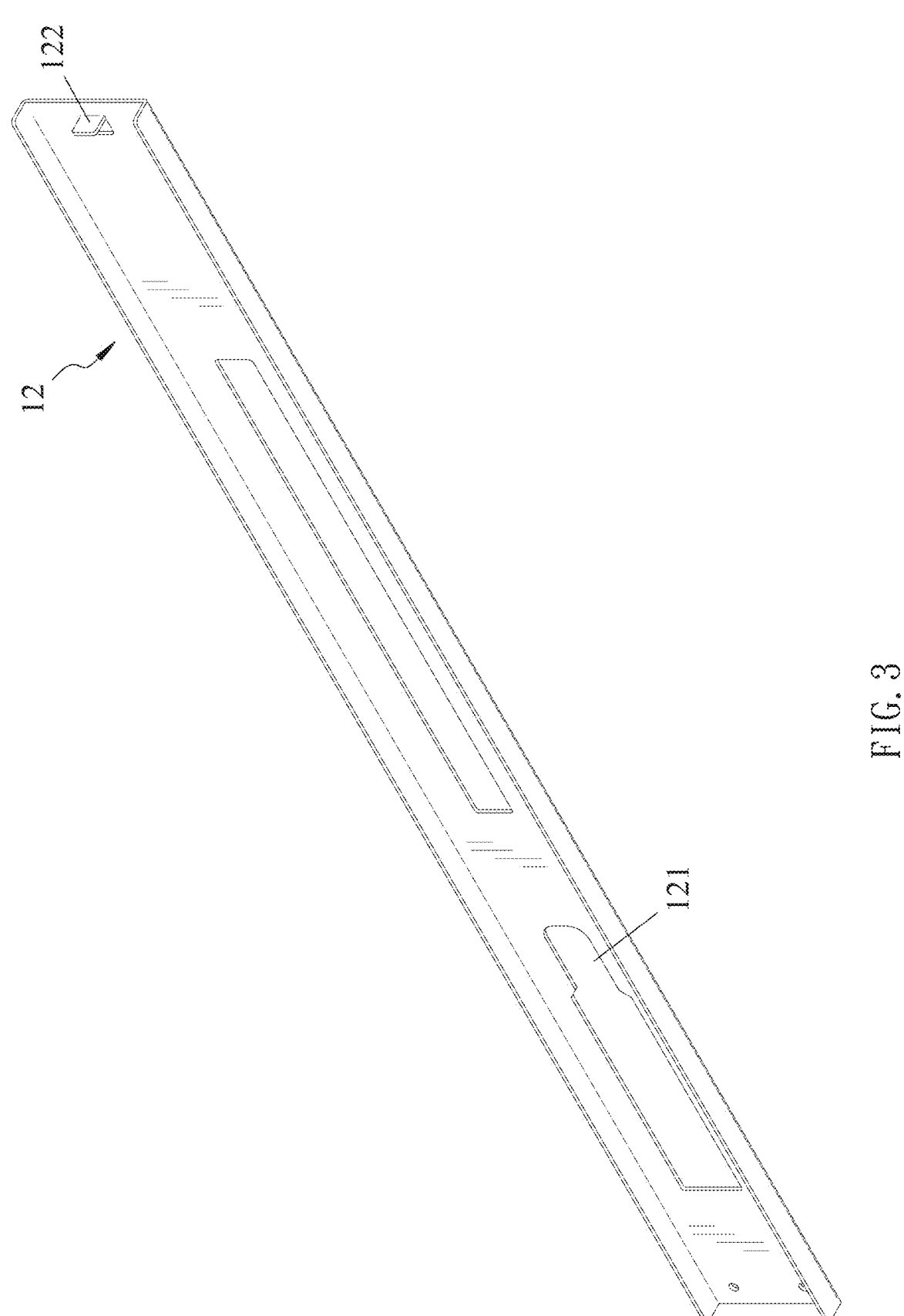
FIG. 3 is a three-dimensional schematic diagram of the first bracket of a slide rail assembly of the present invention.
Figure 4:
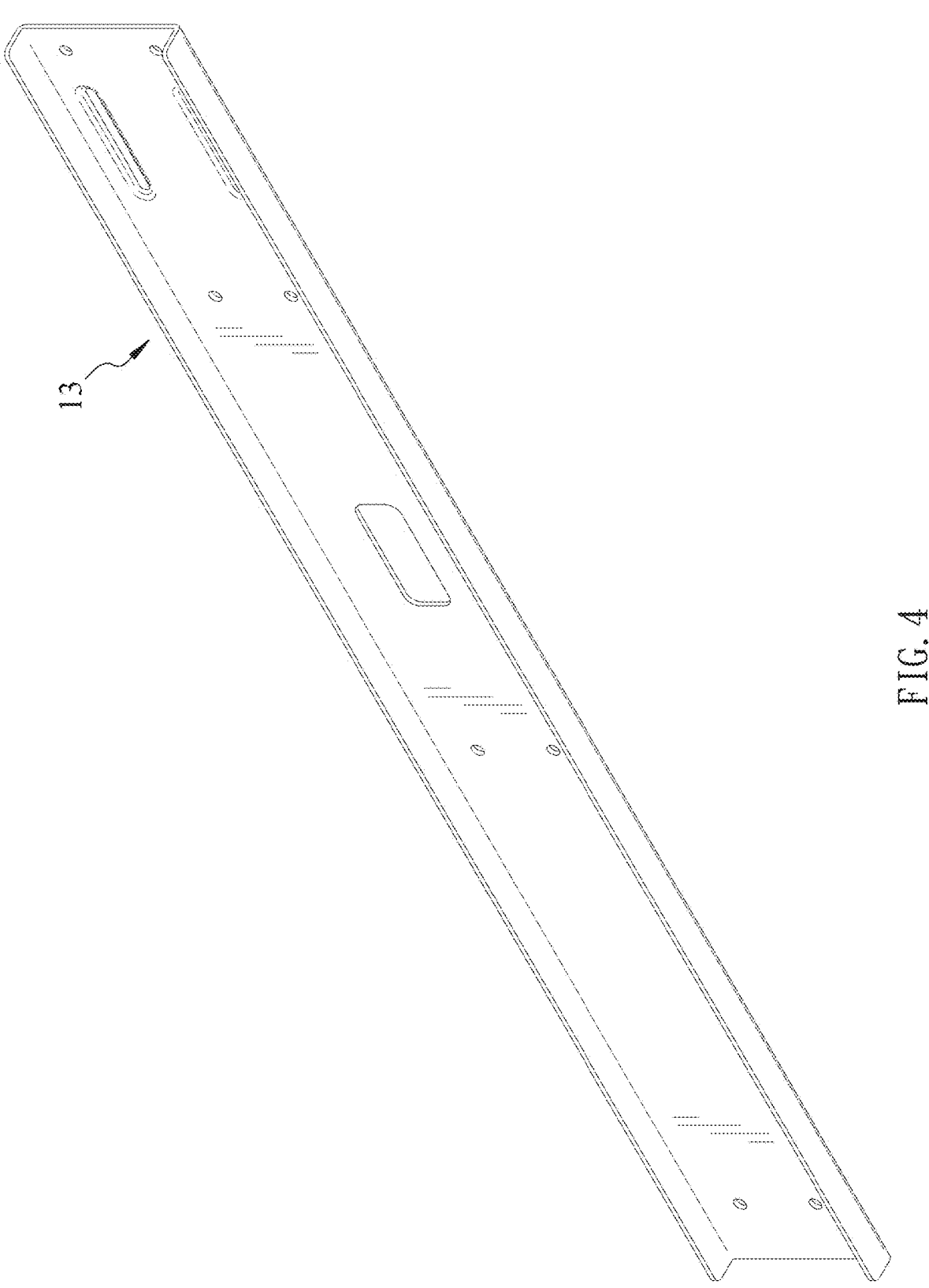
FIG. 4 is a three-dimensional schematic diagram of the second bracket of the slide rail assembly of the present invention.

Please refer to FIG. 1A, FIG. 1B and FIG. 5 again, the first bracket 12 further has a bracket protrusion 122, and the bracket protrusion 122 is assembled with the third fixing groove 1421. The first frame 11 has a first protrusion 112 and a second hollow portion 113. The bracket protrusion 122 is disposed in the second hollow portion 113, and the first protrusion 112 is assembled with the first fixing groove 1411.

Figure 6A:
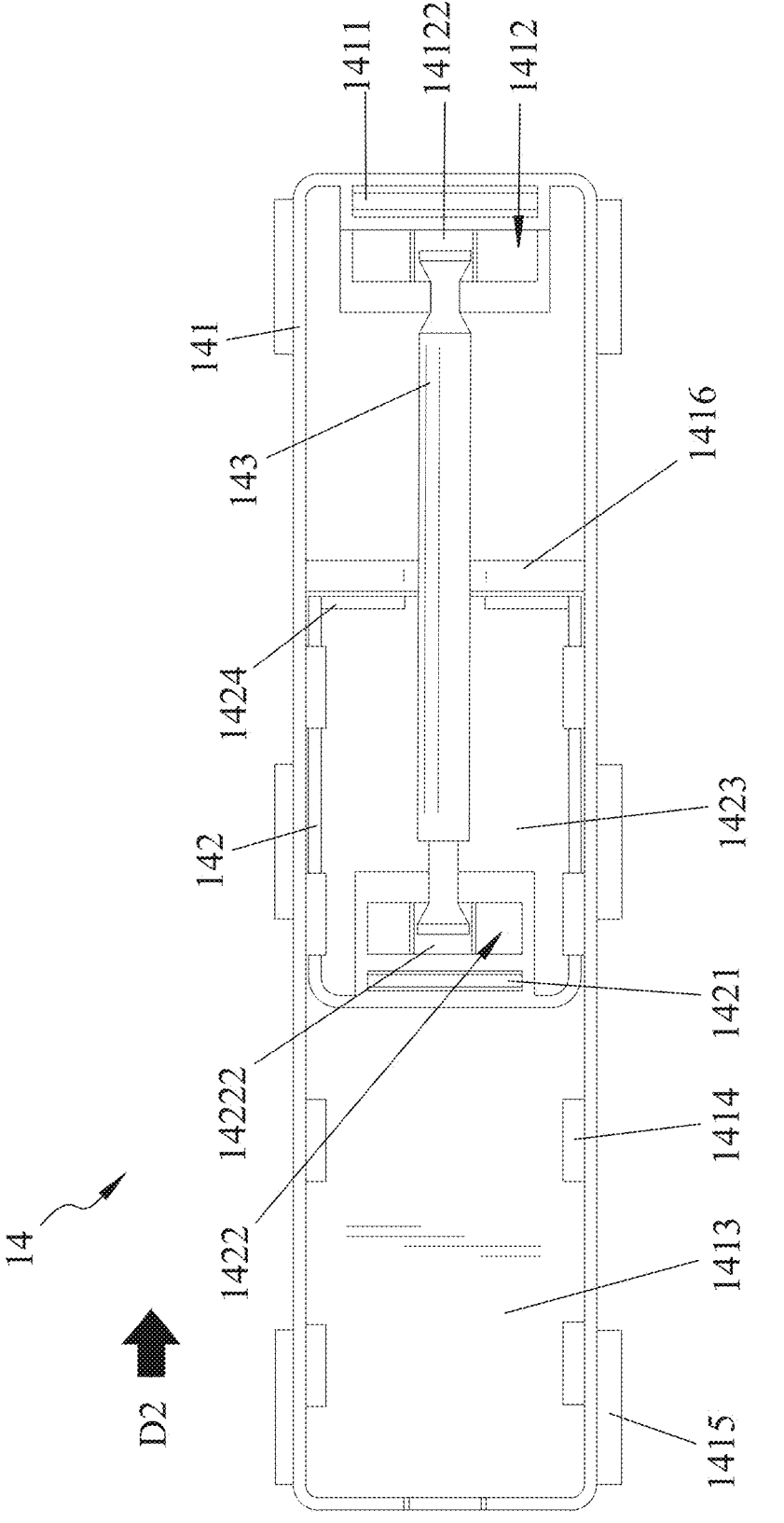
FIG. 6A and FIG. 6B are schematic diagrams showing the extension and reset of the displacement module of the slide rail assembly of the present invention.
Figure 6B:
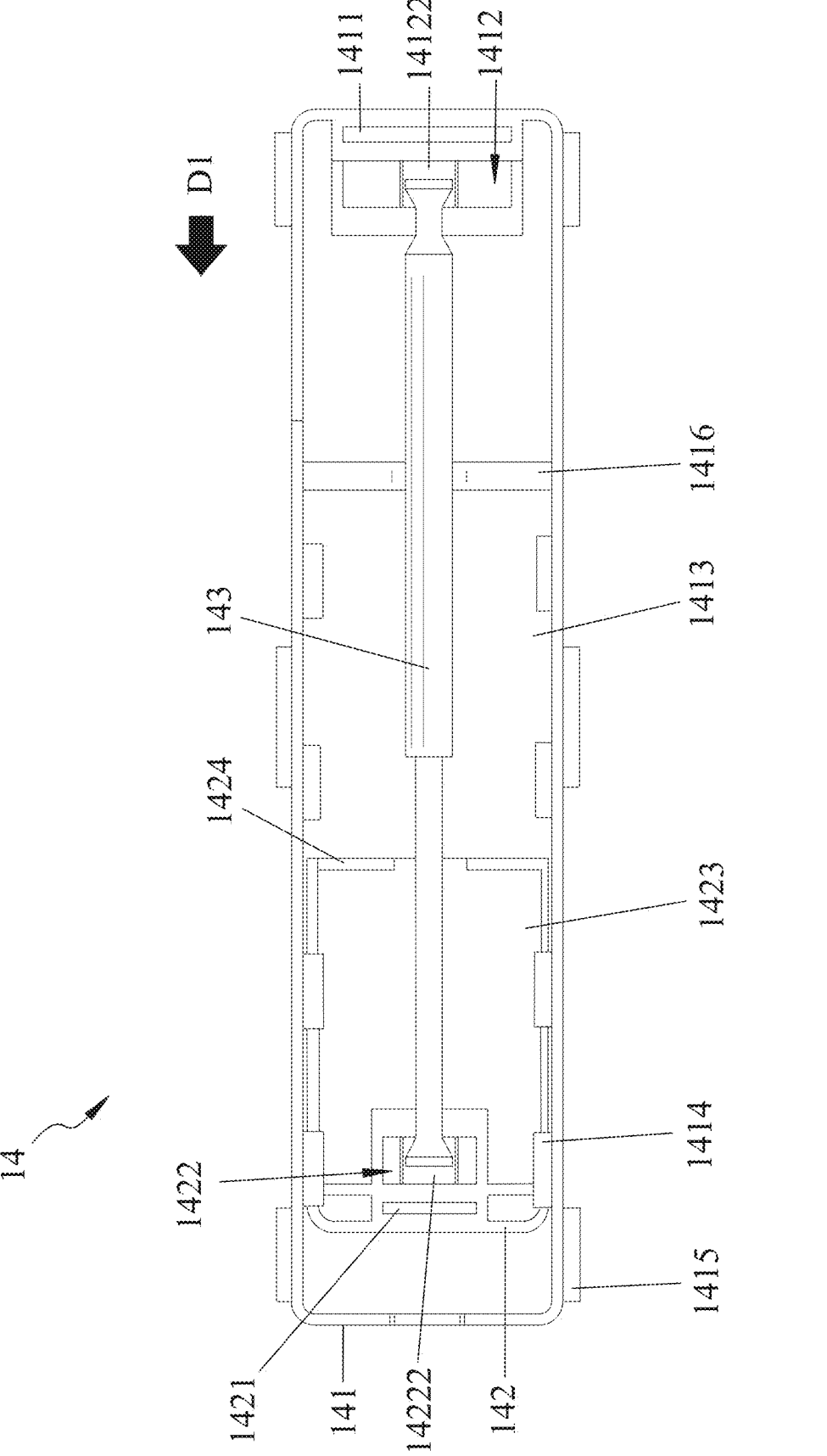

Please refer to FIG. 6A and FIG. 6B again, in which when the telescopic member 143 is extended in the first accommodating space 1413 and the second accommodating space 1423, the end surface of the second shell 142 is abutted by the plurality of first limiting portions 1414 of the first shell 141, and the second shell 142 is displaced in the first accommodating space 1413 toward the first direction D1. When the telescopic member 143 is located in the first accommodating space 1413 and the second accommodating space 1423 and is reset, the second shell 142 is located in the first accommodating space 1413 and is displaced in the second direction D2 which is opposite to the first direction D1. The at least one fourth limiting portion 1424 abuts against the third limiting portion 1416 to limit the second shell 142 in the first accommodating space 1413.

Figure 7:
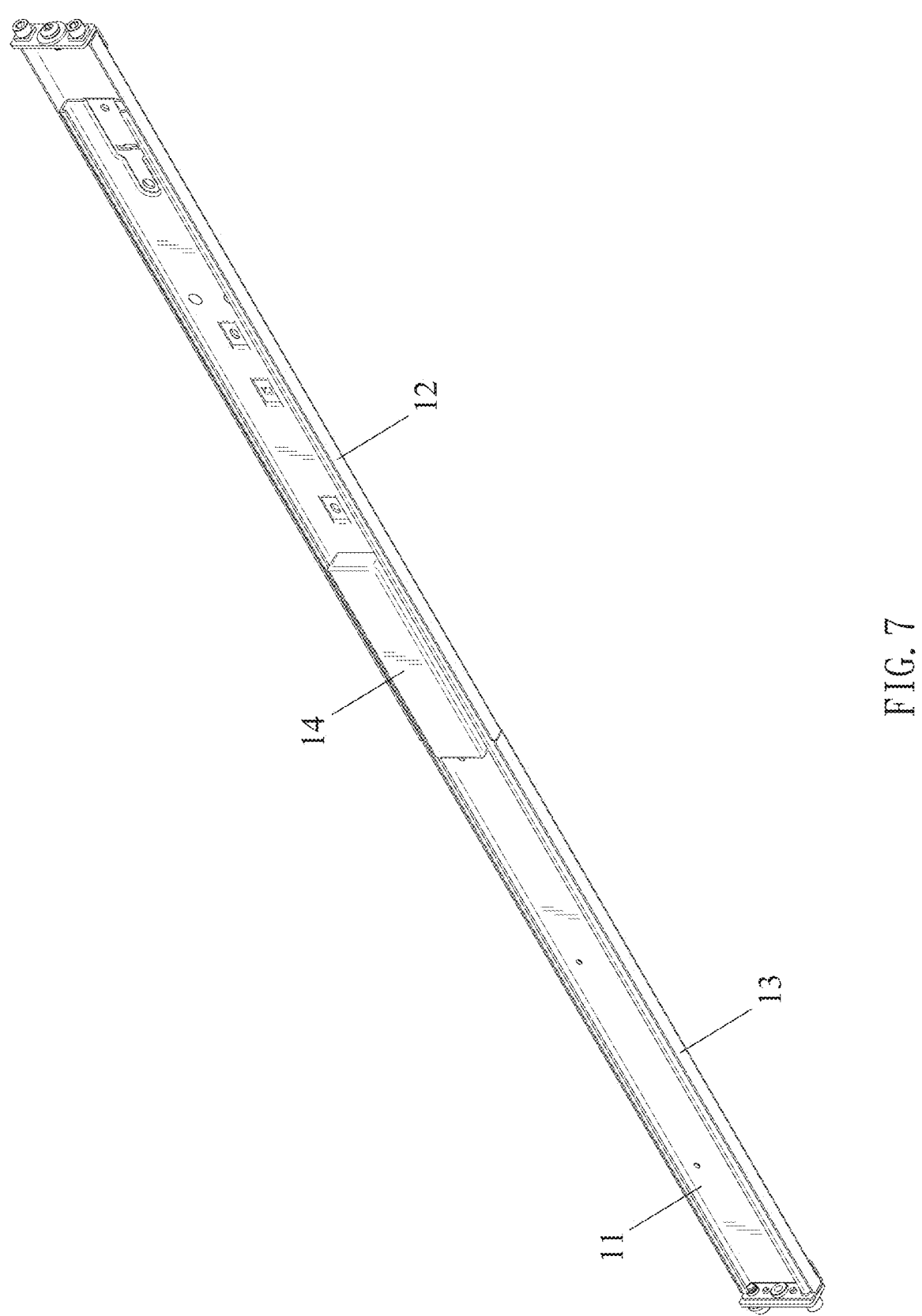
FIG. 7 is a schematic diagram showing the structure of the first frame, the first bracket, the second bracket and the displacement module of the slide rail assembly of the present invention.
Figure 8A:
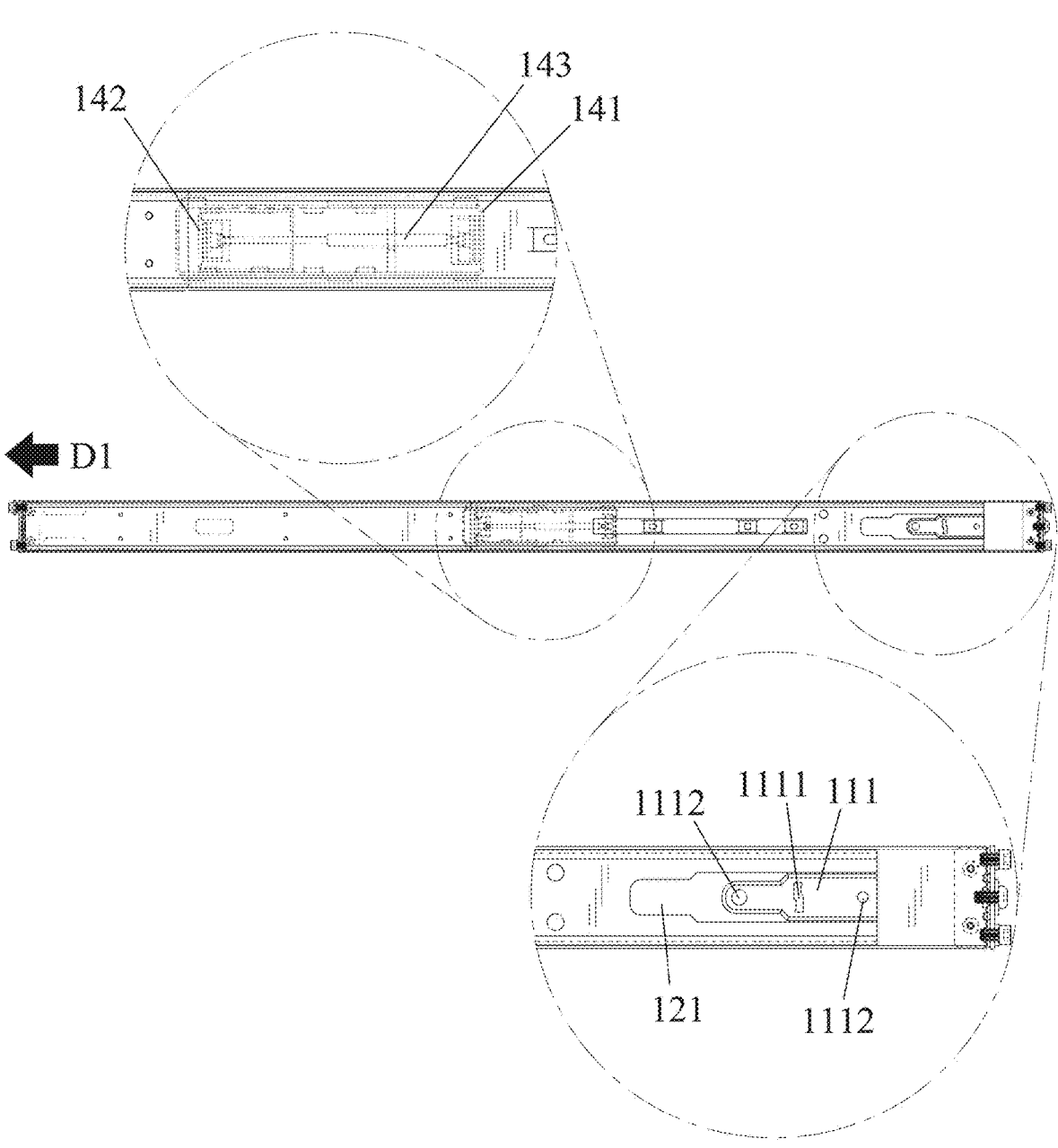
FIG. 8A and FIG. 8B are schematic diagrams showing the displacement and assembly of the first bracket and the displacement module of the slide rail assembly of the present invention to the first frame.
Figure 8B:
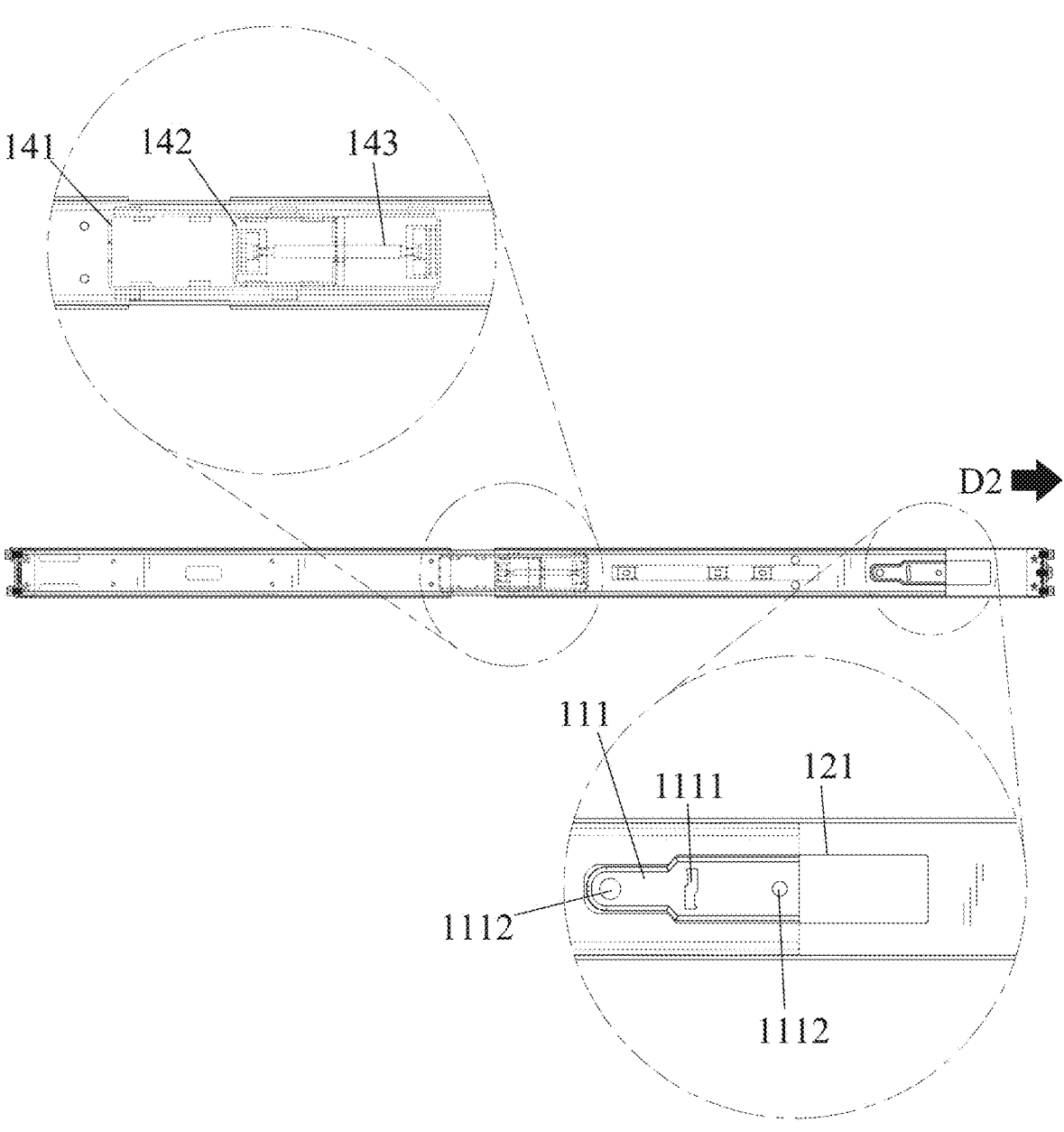
Figure 9:
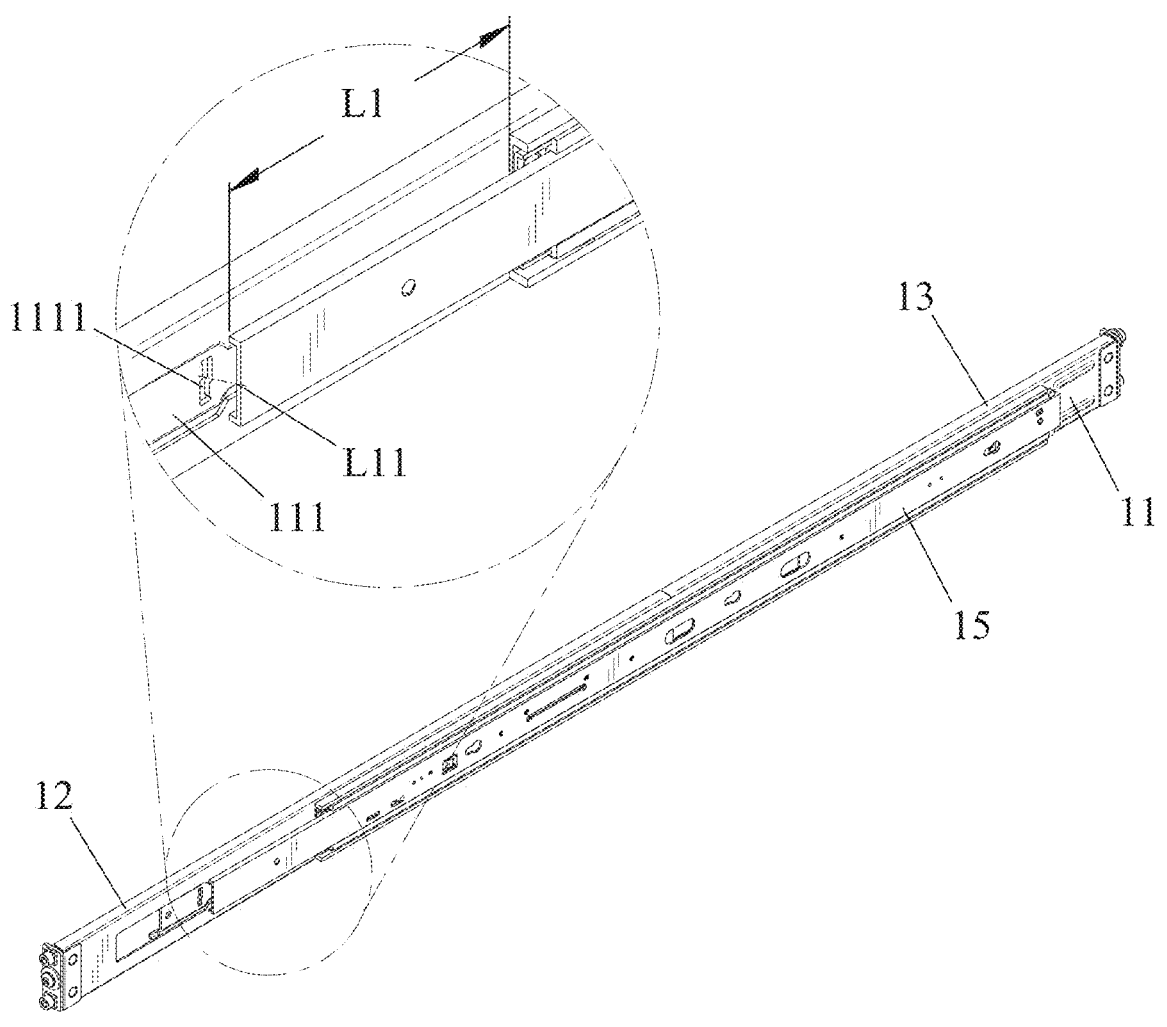
FIG. 9 is a schematic diagram of the slide rail assembly of the present invention with the rail member folded and the extension section adjacent to the positioning plate.

Please refer to FIG. 7, FIG. 8A, FIG. 8B and FIG. 9 again, wherein the first bracket 12 is subjected to force and is displaced and stretched relative to the first frame 11 in the first direction D1, the telescopic member 143 of the displacement module 14 is stretched, the second shell 142 drives the bracket protrusion 122 to displace in the second hollow portion 113, the positioning plate 111 abuts against one end of the first hollow portion 121 to form a limit, and the first bracket 12 is stopped from displacing relative to the first frame 11. When the first bracket 12 is subjected to force and is displaced relative to the first frame 11 in the second direction D2 opposite to the first direction D1, the telescopic member 143 of the displacement module 14 is reset, and the positioning plate 111 abuts against the other end of the first hollow portion 121 to form a limit.

When the rail member 15 is folded, it has an extension section L1. The extension section L1 is adjacent to the positioning plate 111, and the extension section L1 has an extended end surface L11. When the extension section L1 is adjacent to the positioning plate 111, the extended end surface L11 is aligned with the positioning hole 1111 of the positioning plate 111, thereby achieving a precise positioning effect and facilitating subsequent operations or processing.

The rail member 15 may be composed of a first rail, a second rail and a third rail, and its structure, displacement, expansion and retraction are already known techniques, and for the sake of brevity, they are not further described here.

What the invention claimed is:

1. A slide rail assembly, comprising:
   a first frame;
   a first bracket comprising a first hollow portion, said first bracket being displaced relative to said first frame;

a positioning plate comprising a positioning hole, said positioning plate being set on said first frame and located in said first hollow portion; and a displacement module comprising a first shell, a second shell and a telescopic member, said first shell being combined with said first frame, said second shell being combined with said first bracket, said telescopic member having two opposite ends thereof respectively connected to said first shell and said second shell;

thereby, when said telescopic member drives said second shell to be displaced, extended and reset in said first shell, allowing the first bracket to be displaced and extended in a first direction, said positioning plate abuts against one end of said first hollow portion to form a limit to prevent said first bracket from continuing to move in said first direction and drive said first bracket to reset in a second direction opposite to said first direction, and said positioning plate abuts an opposite end of said first hollow portion to form a limit to prevent said first bracket from continuing to move in said second direction.

2. The slide rail assembly as claimed in claim 1, wherein said first frame and said positioning plate are integrally formed.

3. The slide rail assembly as claimed in claim 1, wherein said first frame and said positioning plate are separately made.

4. The slide rail assembly as claimed in claim 1, wherein said first shell comprises a first fixing groove, a second fixing groove, a first accommodating space, a plurality of first limiting portions and a plurality of second limiting portions, said first fixing groove being combined with said first frame, said second limiting portions being respectively abutted against rails of said first frame; said second shell comprises a third fixing groove, a fourth fixing groove and a second accommodating space, said second shell having one end surface thereof abutting said first limiting portions for displacement of said second shell within said first accommodating space, said third fixing groove being combined with said first bracket; said telescopic member has two opposite ends thereof respectively connected to said second fixing groove and said fourth fixing groove, and is accommodated in said first accommodating space and said second accommodating space to extend and reset.

5. The slide rail assembly as claimed in claim 4, wherein said first shell further comprises a third limiting portion, said third limiting portion comprising an abutting side surface; said second shell further comprises at least one fourth limiting portion, said at least one fourth limiting portion corresponding to said abutting side surface of said third limiting portion for limiting said second shell in said first accommodating space.

6. The slide rail assembly as claimed in claim 4, wherein said first bracket further comprises a bracket protrusion combined with said third fixing groove, said bracket protrusion being set within said second hollow portion for displacement; said first frame further comprises a first protrusion and a second hollow portion, said first protrusion being combined with said first fixing groove.

7. The slide rail assembly as claimed in claim 1, wherein said telescopic member is selected from the group of springs, hydraulic rods, pneumatic rods, and other components that are able to be reset after being stretched under force.

8. The slide rail assembly as claimed in claim 1, further comprising a second bracket and a rail member respectively installed on said first frame, said second bracket being located at an opposite end of said first bracket relative to said first frame, said rail member comprising an extension section that protrudes after being folded, said extension section being adjacent to said positioning plate to allow one extended end surface of said extension section to be aligned with said positioning hole of said positioning plate.

9. The slide rail assembly as claimed in claim 1, wherein said positioning plate further comprises two fixing holes, and said positioning hole is located between said two fixing holes.

* * * * *